United States Patent [19]

Ueno

[11] Patent Number: 5,610,670
[45] Date of Patent: *Mar. 11, 1997

[54] OPTHALMIC LENS HAVING A POSITIVE REFRACTIVE POWER

[75] Inventor: Yasunori Ueno, Kanagawa-ken, Japan

[73] Assignee: Nikon Corporation, Tokyo, Japan

[*] Notice: The term of this patent shall not extend beyond the expiration date of Pat. No. 5,550,600.

[21] Appl. No.: 472,926

[22] Filed: Jun. 7, 1995

[30] Foreign Application Priority Data

Jun. 23, 1994 [JP] Japan .................................. 6-164533

[51] Int. Cl.⁶ .................................................. G02C 7/02
[52] U.S. Cl. ........................................... 351/176; 351/159
[58] Field of Search ..................................... 351/159, 176, 351/169

[56] References Cited

U.S. PATENT DOCUMENTS

| | | | |
|---|---|---|---|
| 3,960,442 | 6/1976 | Davis et al. | 351/176 |
| 4,289,387 | 9/1981 | Jalie | 351/159 |
| 4,504,128 | 3/1985 | Guilino et al. | 351/167 |
| 5,050,979 | 9/1991 | Shinohara | 351/159 |
| 5,050,980 | 9/1991 | Shinohara | 351/167 |
| 5,235,357 | 8/1993 | Winthrop et al. | 351/159 |

FOREIGN PATENT DOCUMENTS

| | | |
|---|---|---|
| 52-136644 | 11/1977 | Japan . |
| 2-289818 | 11/1990 | Japan . |

*Primary Examiner*—Georgia Y. Epps
*Assistant Examiner*—Jordan M. Schwartz
*Attorney, Agent, or Firm*—Oliff & Berridge

[57] ABSTRACT

An aspherical ophthalmic lens having a positive refractive power, an axis of symmetry and a periphery includes front and rear refractive surfaces. The front refractive surface has a meridional plane and a sagittal plane that intersects the meridional plane. The sagittal plane has a sagittal plane curvature of $\rho_s$, and the meridional plane has a meridional plane curvature of $\rho_m$. A curvature difference Z, defined as $Z=\rho_m-\rho_s$, decreases from at least approximately 20 mm from the axis of symmetry in a direction toward the periphery. As a result, a thinner and flatter lens having superior optical performance is provided.

9 Claims, 7 Drawing Sheets

OPTHALMIC LENS HAVING A POSITIVE REFRACTIVE POWER

BACKGROUND OF THE INVENTION

1. Field of the Invention

The present invention relates to an aspherical ophthalmic lens, and in particular, to the surface shape of the first surface of such a lens that has a positive refractive power.

2. Background of Related Art

Spherical surfaces are conventionally used on the first refractive surface (the surface on the side of the lens opposite the eye, i.e., the front refractive surface) of ophthalmic lenses that are used to correct refractive errors of the eye. A spherical surface is used because it is easy to manufacture. On the second refractive surface (the surface on the same side as the eye, i.e., the rear refractive surface), toric surfaces, as well as spherical surfaces, are used to correct astigmatism and other refractive errors. Hereinafter, a lens on which a spherical surface is used as the first surface will be referred to as a spherical lens, and a lens on which an aspherical surface is used as the first surface will be referred to as an aspherical lens.

Generally, the refractive power of a lens is expressed in units of diopters (D). The refractive power at the lens surface (the surface refractive power SRP) is defined in terms of the surface curvature $\rho$ (in units of $m^{-1}$), the radius of curvature R (where $R=1/\rho$) and the refractive index n of the lens material as $$SRP(D)=(n-1)\times\rho=(n-1/R).$$

The refractive power of the first surface of the lens is hereinafter referred to specifically as the base curve. The curvature corresponding to the base curve is hereinafter referred to as the base curve curvature.

The refractive power of the lens is primarily determined by the refractive powers of the first and second refractive surfaces. Therefore, various values of the base curve can be used to obtain a desired lens refractive power, depending upon how the two surface refractive powers are combined. In practice, however, the base curve is limited to a characteristic range for the refractive power of the lens. By using a characteristic base curve, optical performance is ameliorated because the astigmatic aberration effect on the eye that results from viewing objects through sides of the lens that are spaced from the optical axis is reduced.

Generally, the known solution for minimizing the astigmatic aberration of an ophthalmic lens is referred to as Tscherning's ellipse. Tscherning's ellipse provides a hypothetical solution to the problem for a thin lens. In an actual lens, because the design accounts for the actual path of the light rays (i.e., the so-called ray trace) due to the center thickness of the lens, the actual solution is slightly different from the hypothetical solution. Nevertheless, the hypothetical solution provides an accurate approximation of the actual solution.

According to Tscherning's ellipse, the optimum base curve to minimize astigmatic aberration differs for far-range viewing and close-range viewing. In other words, the optimum base curve differs according to whether the lens is designed for far-range or close-range viewing. When far-range viewing and close-range viewing are equally emphasized (i.e., given the same weight in the calculations), values of the required base curve can be interpolated from the far-range vision base curve values and the close-range vision base curve values.

As a result, three conceivable designs exist, depending upon whether far-range viewing, close-range viewing or both are considered important. For the present invention, a design for far-range viewing and a design for close-range viewing will be described. A design that accounts for far- and close-range viewing equally, however, can be determined by those of ordinary skill in the art as a variant of these two designs.

The primary disadvantage arising from using lenses having a positive refractive power to correct for presbyopia and hypermetropia is that as the refractive power becomes stronger, the center thickness increases. Because large curvatures have to be used, the convex protrusion becomes more pronounced and detracts from the appearance of the lens.

In addition, as the lens curvature and refractive power increase, the image magnification ratio with respect to the retina of the eye also increases. Generally, the image magnification ratio M due to an ophthalmic lens is given by the following expression:

$$M=\{1/(1-d1*L)\}*\{1/(1-d*L1/n)\}$$

In this expression, d1 is the distance along the optical axis between the entrance pupil and the rear vertex of the lens (in units of m), L is the rear vertex power of the lens (in units of D), d is the thickness of the center of the lens (in units of m), n is the refractive index of the lens and L1 is the refractive power of the first surface of the lens (in units of D). The first bracketed expression is the dioptric factor and the second bracketed expression is the shape factor.

FIG. 5 shows a lens surface shape of a conventional spherical surface lens that has been designed for far-range viewing (infinitely far). The refractive power of the lens in the Fig. is 4.0 D, and the lens diameter is 70 mm. This lens is a commonly used plastic lens with an refractive index of 1.50. The base curve is 9.0 D, and the edge thickness is 1.0 mm. The lens center thickness d is 6.6 mm, and the convex surface of the lens protrudes by 13.4 mm. As a result, the lens is very thick and unattractive. In this example, the radius of curvature R1 of the first side (the surface to the left of the drawing) is 55.555 mm, the radius of curvature R2 of the second surface (the surface to the right of the drawing) is 93.111 mm and the image magnification ratio M is 1.157. In other words, the image magnification ratio is 15.7%. As is known, the center thickness and the amount by which the lens protrudes can be reduced by decreasing the base curve.

FIG. 6 shows the lens surface shape of a lens with the same refractive power as that shown in FIG. 5 (4.0 D) with a base curve of 4.5 D. In this example, the lens center thickness is 5.9 mm, which is 0.7 mm thinner than the lens of FIG. 5. In addition, the protrusion amount is 6.7 mm, which is about half the protrusion amount of the lens of FIG. 5. In this example, the radius of curvature R1 of the first side is 111.111 mm, the radius of curvature R2 of the second side is 859.631 mm and the image magnification ratio M is 1.131. In other words, the image magnification ratio is 13.1%.

As one result of reducing the base curve, the image magnification ratio of the lens of FIG. 6 is smaller than that of the lens in FIG. 5. As another result of reducing the base curve, the shape factor of the lens of FIG. 6 decreases. As the refractive power increases due to the decreasing base curve, the effects of decreasing the image magnification ratio and decreasing the shape factor become more evident. Because the base curve itself is established from the standpoint of optical performance, however, the low base curve value of 4.5 D in this example results in poor optical performance.

FIGS. 7 and 8 show astigmatism in the field of view when lenses having base curves of 9.0 D and 4.5 D, respectively, are used. The vertical axis shows the angle of the field of view (units of °), and the horizontal axis shows the astigmatism (units of D, the difference (m–s) between the meridional direction (m) and the sagittal direction (s)) taking the refractive power on the optical axis as the standard.

As shown in FIG. 7, in the lens with the base curve of 9.0 D, the astigmatism is desirably reduced over virtually the entire field of vision. Conversely, as shown in FIG. 8, in the lens with the base curve of 4.5 D, the astigmatism increases significantly toward the periphery of the field of vision. Therefore, FIGS. 7 and 8 show how selecting a base curve affects the final optical performance.

FIG. 9 shows the lens surface shape of a conventional spherical surface ophthalmic lens that is based on the close-range (30 cm) design. The refractive power of the ophthalmic lens shown is 4.0 D, and the lens diameter is 70 mm. This lens is a commonly used plastic lens with a refractive index of 1.50. The base curve is 7.0 D, and the lens edge thickness is 1.0 mm. In the case of this conventional example, the lens center thickness d is 6.2 mm, and the amount by which the convex surface protrudes is 10.2 mm. Although the protrusion amount is smaller than that of the lens designed for far-range viewing, the lens is thick and unattractive. In this example, the radius of curvature R1 of the first side is 71.429 mm, the radius of curvature R2 of the second side is 155.866 mm, and the image magnification ratio M is 1.144. In other words, the image magnification ratio becomes 14.4%. As discussed above in connection with the lens of FIG. 5, the base curve can be reduced to decrease the center thickness, the amount by which the lens protrudes and the image magnification ratio.

FIG. 10 shows the surface shape of a lens that has the same refractive power as the lens of FIG. 9 (4.0 D) and a base curve of 4.25 D. In this example, the lens center thickness is 5.9 mm, which is 0.3 mm thinner than the lens of FIG. 9. The amount by which the lens protrudes is 6.3 mm, which is 3.9 mm less than the protrusion amount of the lens of FIG. 9. In this example, the radius of curvature R1 of the first side is 117.647 mm, the radius of curvature R2 of the second side is 1549.776 mm and the image magnification ratio M is 1.130. In other words, the image magnification ratio is 13.0%.

As one result of reducing the base curve, the image magnification ratio of the lens of FIG. 10 is smaller than that of the lens in FIG. 9. As another result of reducing the base curve, the shape factor of the lens of FIG. 10 decreases. As the refractive power increases due to the decreasing base curve, the effects of decreasing the image magnification ratio and decreasing the shape factor become more evident. Because the base curve itself is established from the standpoint of optical performance, however, the low base curve value of 4.25 D in this example results in poor optical performance.

FIGS. 11 and 12 show astigmatism in the field of vision when lenses of 7.0 D and 4.25 D, respectively, are used. As shown in FIG. 11, in the lens with the base curve of 7.0, the astigmatism is desirably reduced over virtually the entire field of vision. Conversely, as shown in FIG. 12, in the lens with the base curve of 4.25 D, the astigmatism increases significantly toward the periphery of the field of vision.

Several methods exist for addressing the undesirable external appearance and reduced optical performance of a lens with a positive refractive power. These methods require using an aspherical surface as the first refractive surface. Examples of such aspherical lenses include Japanese Laid-open Patent Applications 52-136644 and 2-289818 and U.S. Pat. No. 4,504,128.

In the aspherical lens of Japanese Patent Application 52-136644, the aspherical lens includes quadratic lines, such as elliptical, parabolic, and hyperbolic lines, as the meridional line. By rotating these quadratic lines, the aspherical first refractive surface of the lens is formed. At present, this is the most common type of aspherical lens.

In the aphakia eye aspherical lens disclosed in U.S. Pat. No. 4,504,128, the aspherical surface is defined by an exponential function relating to the radius r, which is based on quadratic lines.

The common disadvantage of the lenses described above is that the curvature of the meridian line decreases rapidly and nearly monotonically from the center of the lens toward the periphery. As a result, the refractive power of the lens in the region adjacent the periphery is lower than the refractive power in the center region, and therefore, the effective field of vision from the standpoint of the user is reduced. In the case of aphakia eye ophthalmic lenses in particular, because a high refractive power aspherical surface is used, the effective field of vision decreases undesirably to a range of approximately 30 mm to at most 40 mm.

Similarly, the aspherical lens disclosed in Japanese Patent Application 2-289818 aims to achieve both high optical performance and a desirable external appearance. However, although the aspherical lens obtains a somewhat suitable result, the optical performance is still not sufficient.

SUMMARY OF THE INVENTION

One object of the present invention is to provide an aspherical surface ophthalmic lens having a positive refractive power that provides superior optical performance with a thin, flat and otherwise desirable external appearance.

In order to achieve this and other objects, the present invention provides an aspherical ophthalmic lens having an axis of symmetry and a periphery. The lens includes front and rear refractive surfaces. The front refractive surface includes a meridional plane and a sagittal plane that intersects the meridional plane. The sagittal plane has a sagittal plane curvature of $\rho_s$, and the meridional plane has a meridional plane curvature of $\rho_m$. A curvature difference Z defined as $Z=\rho_m-\rho_s$ decreases over a range from the axis of symmetry to at least approximately 20 mm in a direction from the axis of symmetry toward the periphery.

The value of Z in the direction from the axis of symmetry toward the periphery can decrease monotonically. When a refractive index of the lens is n and a distance from the axis of symmetry in the direction from the axis of symmetry toward the periphery is h, the value of $|Z|$ can be at least as great as $(n-1)*\rho*n$ where $\rho$ is the curvature of the front refractive surface at the axis of symmetry. Preferably, the value of $|Z|$ can also be less than $1000*(n-1)*\rho*n$.

The sagittal plane and meridional plane curvatures can be selected such that the lens provides correction for far-range viewing, close-range viewing, or viewing at any intermediate distance.

As described above, on a common spherical lens, the optimum base curve is close to the curve calculated from Tscherning's ellipse. When this curve is employed, a satisfactory optical performance can be obtained. However, on spherical lenses that are based on Tscherning's ellipse, the center of the lens becomes thicker as the refractive power increases. In addition, because the curve of the second surface becomes stronger, the protrusion of the lens becomes stronger and thus very noticeable.

Therefore, a base curve that is weaker than the optimal base curve must be used to achieve an improved external appearance. As described above, minimizing the astigmatism of the ophthalmic lens is also desirable. The astigmatism is increased if a weaker base curve is used. Because of the aspherical shape of the first refractive surface of the lens of the present invention, the astigmatism generated through using the weaker curve is corrected. Therefore, the lens provides superior optical performance and an improved external appearance because of the decreased lens center thickness, the decreased protrusion amount and the decreased image magnification ratio.

The difference between the two curvatures of the lens changes according to the astigmatic aberration and the height of the lens surface. Therefore, the value of the curvature difference from the center to the lens periphery becomes significant when the curvature of the meridional surface of the frontal refractive surface is $\rho_m(m^{-1})$, and the curvature of the sagittal plane which orthogonally crosses the meridional plane is $\rho_s(m^{-1})$.

BRIEF DESCRIPTION OF THE DRAWINGS

A complete understanding of the present invention may be obtained by reference to the accompanying drawings, when considered in conjunction with the subsequent detailed description thereof, in which.

DETAILED DESCRIPTION OF PREFERRED EMBODIMENTS

Figure 1:
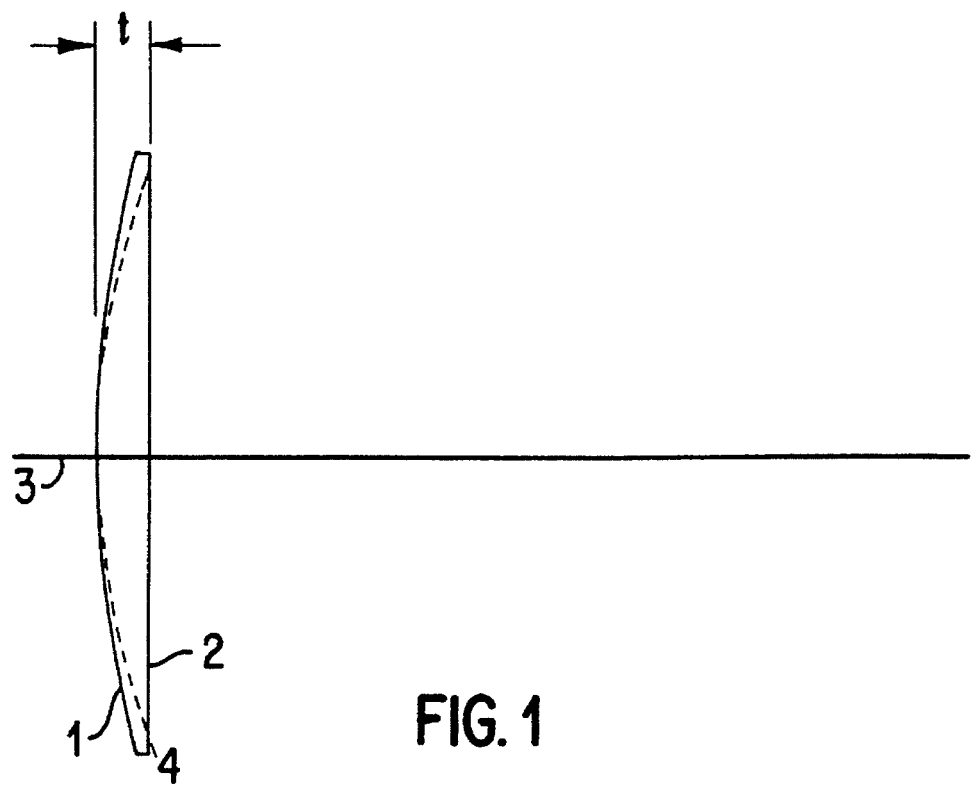
FIG. 1 is a sectional view that shows the lens surface shape of an aspherical ophthalmic lens of a first embodiment of the present invention.
Figure 2A:
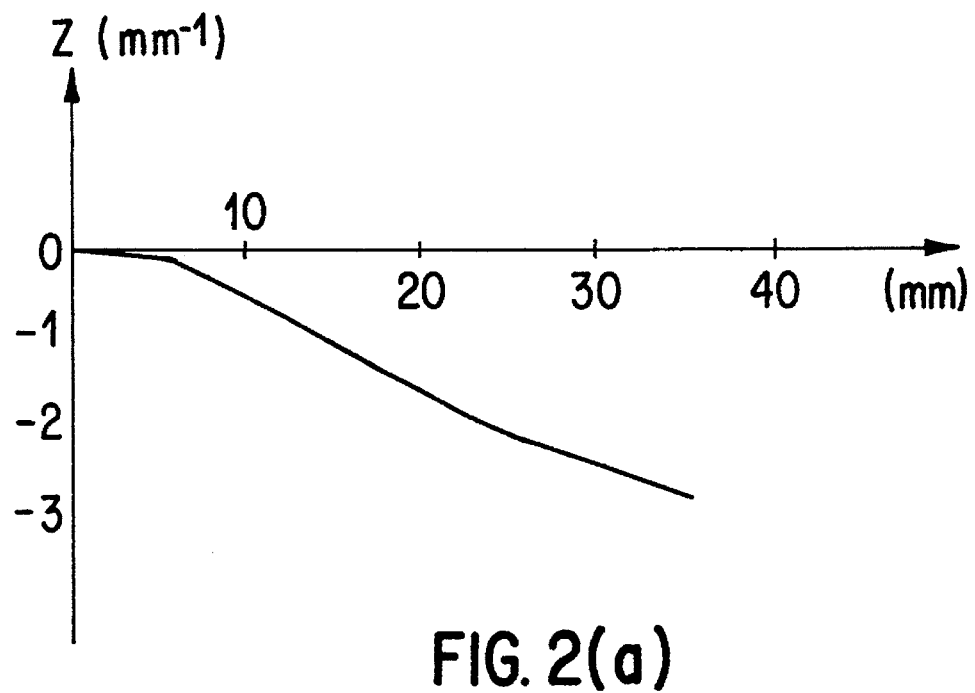
FIG. 2(a) is a graph showing the variation of the curvature difference $Z=\rho_m-\rho_s$ from the center to the periphery of the aspherical ophthalmic lens of FIG. 1.

FIG. 1 shows the lens surface shape of an aspherical ophthalmic lens of a first embodiment of the present invention. When the curvature of the meridional plane (which extends parallel to the page) of the front refractive surface is taken as $\rho_m$ (in units of $m^{-1}$) and the curvature of the sagittal plane (which extends perpendicular to the page and intersects the meridional plane at a right angle) is taken as $\rho_s$, the variations of the value $Z=\rho_m-\rho_s$ representing the difference of the curvatures from the center to the periphery and the resulting astigmatism are shown by FIG. 2(a) and (b), respectively.

Figure 6:
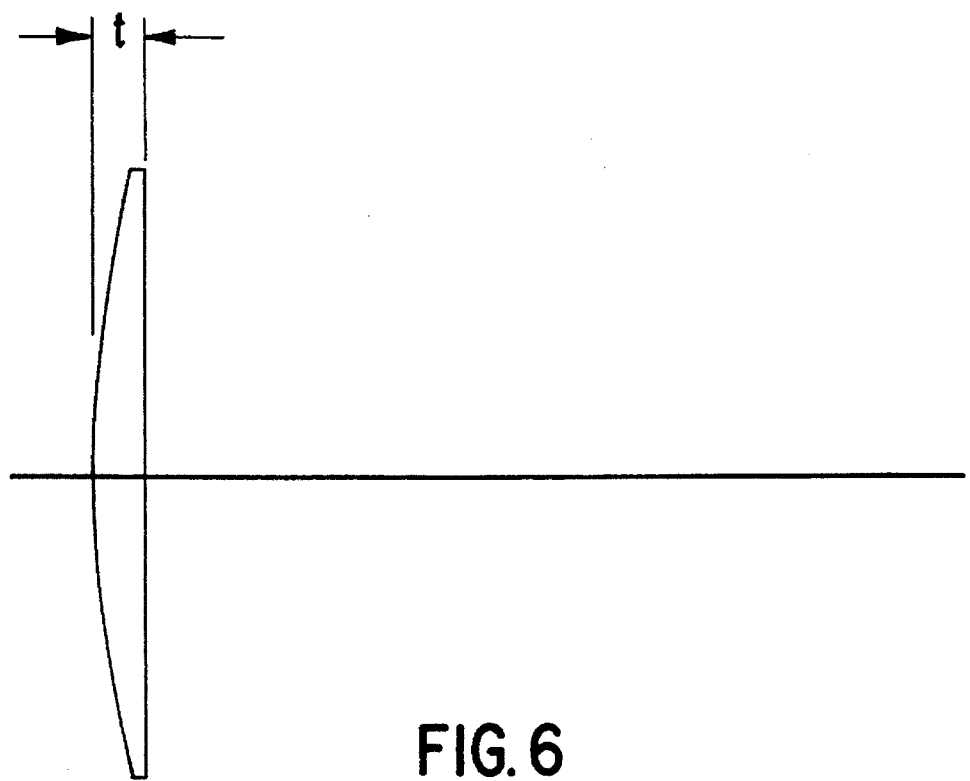
FIG. 6 is a sectional view that shows the lens surface shape of a lens with the same refractive power as the lens of FIG. 5 (4.0 D) and a base curve of 4.5 D.
Figure 7:
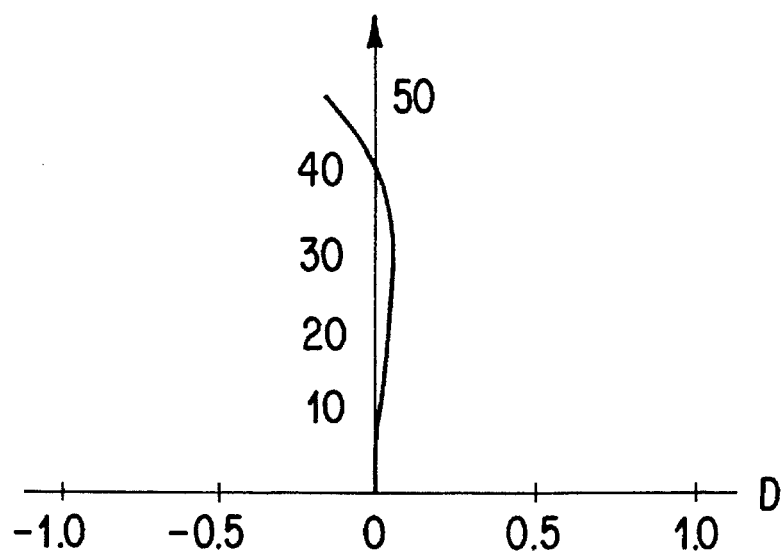
FIG. 7 is an aberration diagram that shows the astigmatism in the field of vision when the lens of FIG. 5 having a base curve of 9.0 D is used.

The lens shown in FIG. 1 is an aspherical lens that corresponds to the spherical lens of FIG. 6 described above, which has a refractive power of 4.0 D and a base curve of 4.5 D. This lens embodies the present invention for far-range (infinitely far) viewing.

The lens of FIG. 1 includes a first refractive surface cross section 1, a second refractive surface cross section 2, and an axis of symmetry 3. A dashed line 4 represents an arc with a curvature corresponding to the base curve of a conventional spherical lens. The radius of curvature R1 of the arc 4 is 111.111 mm, and the radius of curvature R2 of the cross section of the second refractive surface cross section 2 is 877.956 mm.

The first refractive surface cross section 1 (the meridional line) has the same base curve curvature as the arc 4 in the vicinity of the axis of symmetry 3, but the curvature becomes smaller than the base curve curvature (i.e., the radius of curvature becomes larger) near the periphery of the lens. As a result, the first refractive surface cross section 1 projects farther forward than the arc 4 of the base curve.

FIG. 2(a) shows the difference Z between the curvatures in the meridional and sagittal directions. The horizontal axis shows a distance h from the axis of symmetry 3 and the vertical axis shows the value Z. The specific values of Z are as shown in the following Table 1.

TABLE 1

| h (mm) | Z ($m^{-1}$) |
|---|---|
| 0.0 | 0.000 |
| 5.0 | −0.154 |
| 10.0 | −0.567 |
| 15.0 | −1.116 |
| 20.0 | −1.662 |
| 25.0 | −2.110 |
| 30.0 | −2.434 |
| 35.0 | −2.738 |

As shown in FIG. 2(a), the value of Z slowly decreases as the distance h from the axis of symmetry 3 increases. The rate of decrease in the value of Z begins to slow in the region of 20 to 25 mm from the axis of symmetry 3.

FIG. 1 shows the shape of the first refractive surface that results from varying the Z value in this manner. In the lens of FIG. 1, the center thickness can be decreased more than in a conventional ophthalmic lens. Moreover, the protrusion of the first refractive surface of the conventional lens can also be reduced.

Figure 5:
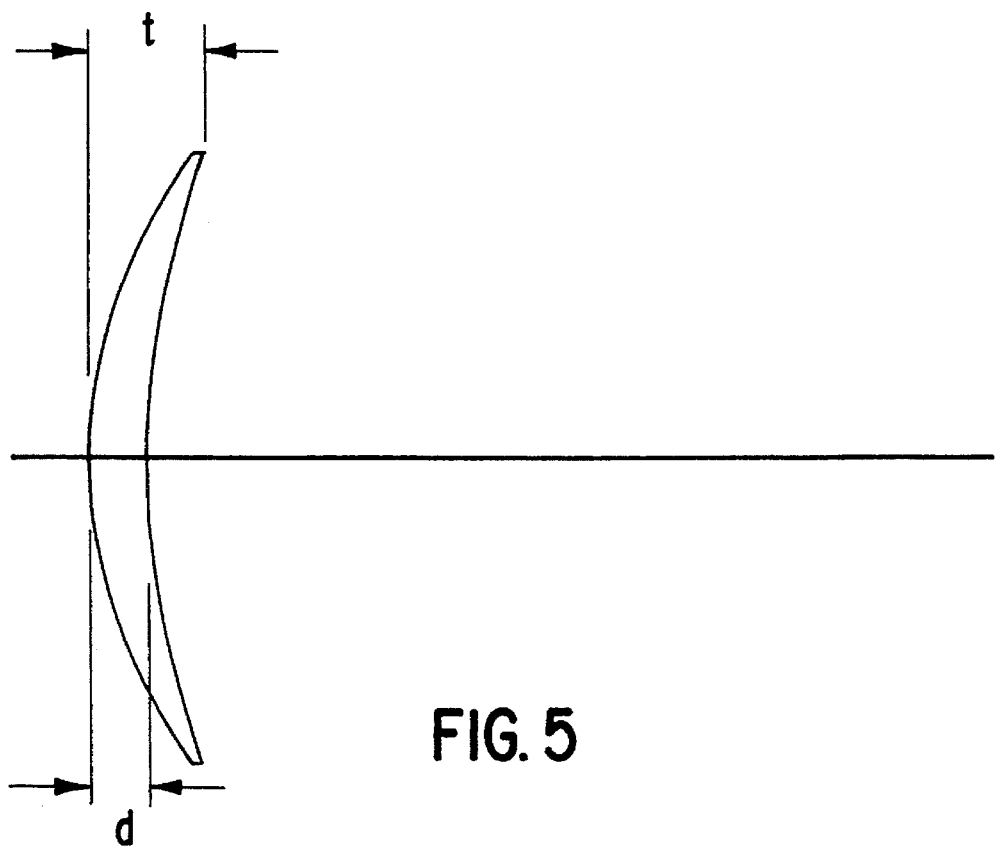
FIG. 5 is a sectional view that shows the lens surface shape of a conventional spherical ophthalmic lens that is designed for far-range viewing.

In the lens of the first embodiment, the center thickness is 5.1 mm, and the amount by which the lens protrudes is 5.8 mm. Compared with the corresponding conventional spherical lens of FIG. 5, the lens of the first embodiment results in a decrease in center thickness of 1.5 mm and a 7.6 mm decrease in the protrusion amount, thereby producing a thinner and flatter lens.

Figure 2B:
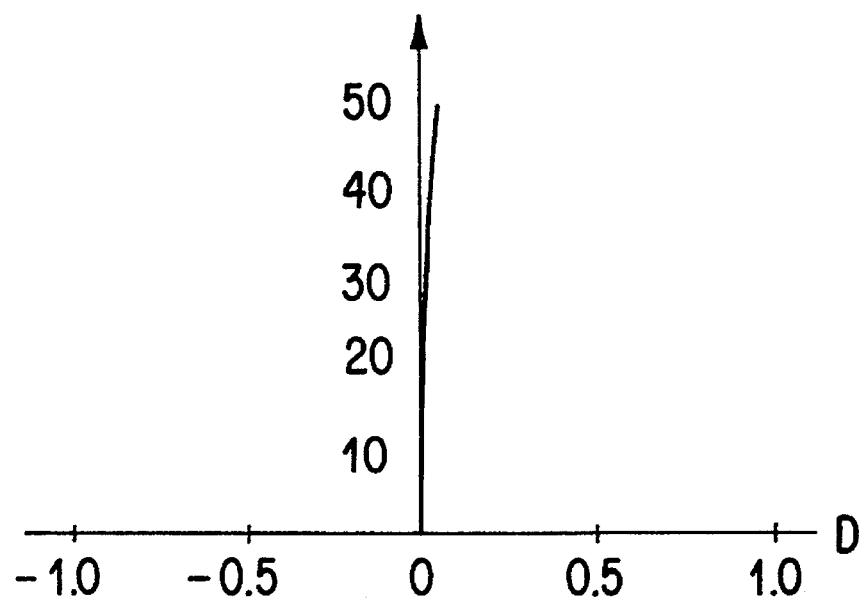
FIG. 2(b) is an aberration diagram showing the variation in astigmatism for the aspherical ophthalmic lens of FIG. 1.
Figure 8:
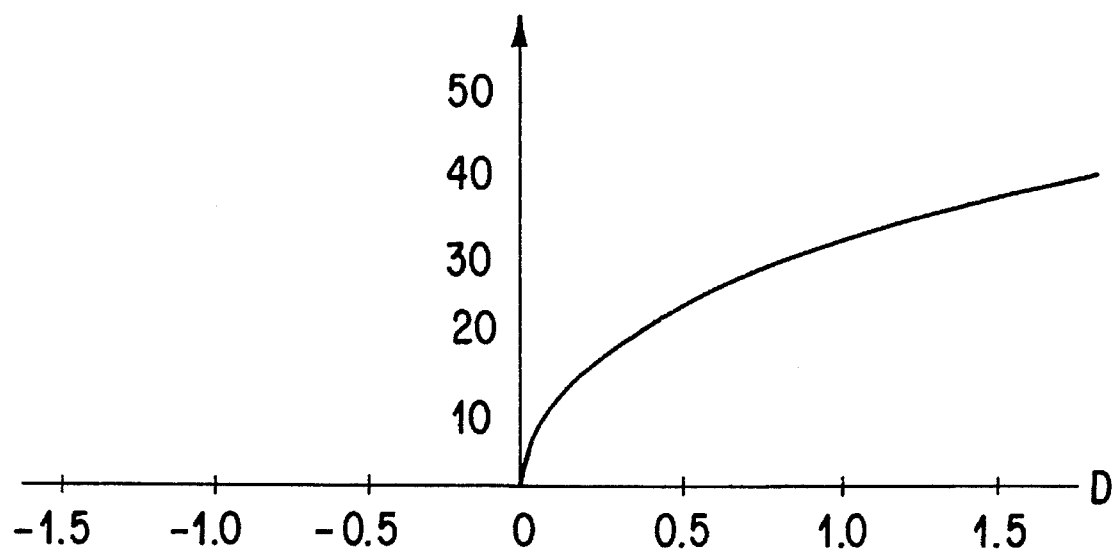
FIG. 8 is an aberration diagram that shows the astigmatism in the field of vision when the lens of FIG. 6 having a base curve of 4.5 D is used.

FIG. 2(b) shows the astigmatism for far-range viewing (infinitely far) when the lens of FIG. 1 is used. Even though the base curve is decreased to 4.5 D, as with the lens shown in FIG. 6, FIG. 2(b) shows that the astigmatism is sufficiently corrected when the lens of FIG. 1 is used. The difference can be clearly seen when compared with FIG. 8, which shows the astigmatism when the lens shown in FIG. 6 is used.

Figure 3:
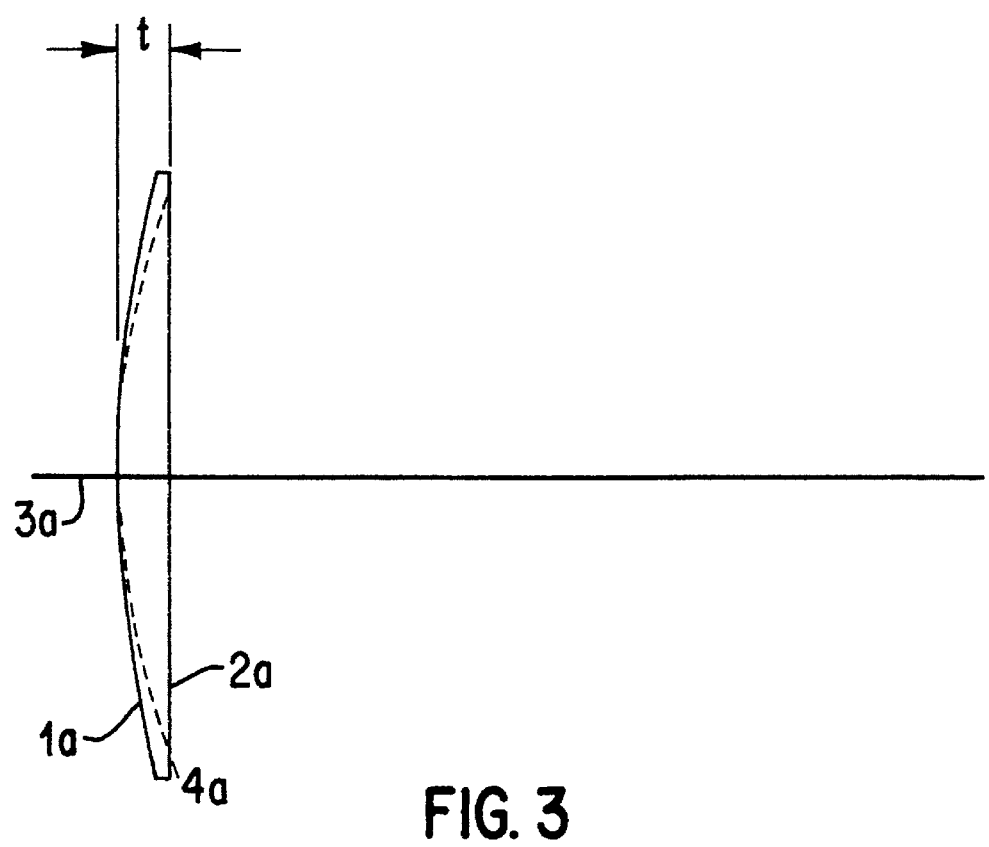
FIG. 3 is a sectional view that shows the lens surface shape of an aspherical ophthalmic lens of a second embodiment of the present invention.
Figure 4A:
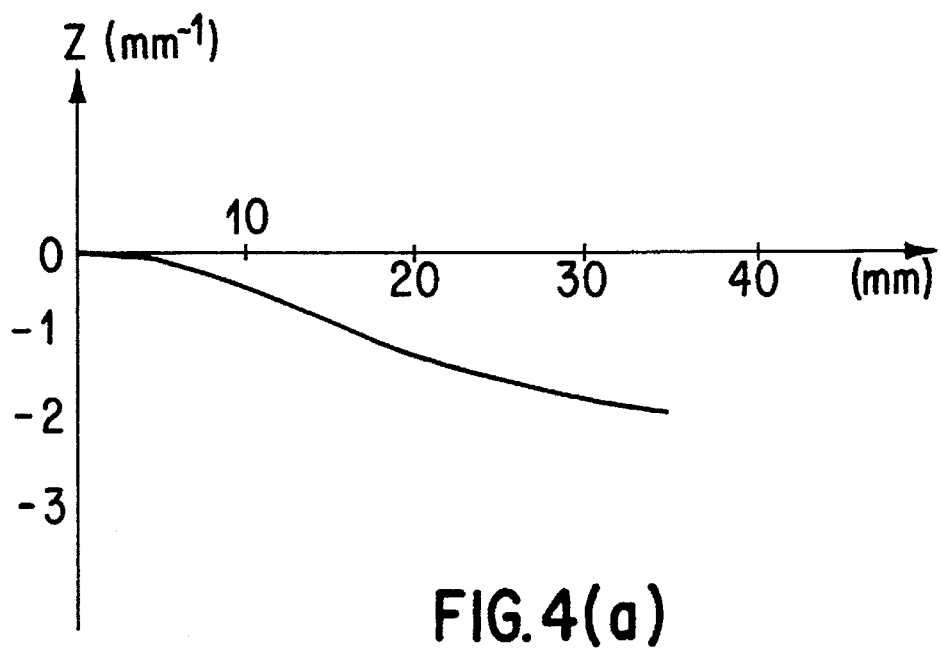
FIG. 4(a) is a graph that shows the variation of the curvature difference $Z=\rho_m-\rho_s$ from the center to the periphery of the aspherical ophthalmic lens of FIG. 3.

FIG. 3 shows the lens surface shape of an aspherical ophthalmic lens of a second embodiment of the present invention. The lens of the second embodiment reduces the astigmatism for close-range viewing (30 cm) to virtually zero. When the curvature of the meridional plane of the front refractive surface is taken as $\rho_m$ and the curvature of the sagittal plane is taken as $\rho_s$, the variations of the value $Z=\rho_m-\rho_s$ of the difference of the curvatures from the center to the periphery and the resulting astigmatism are shown by FIGS. 4(a) and (b), respectively.

Figure 10:
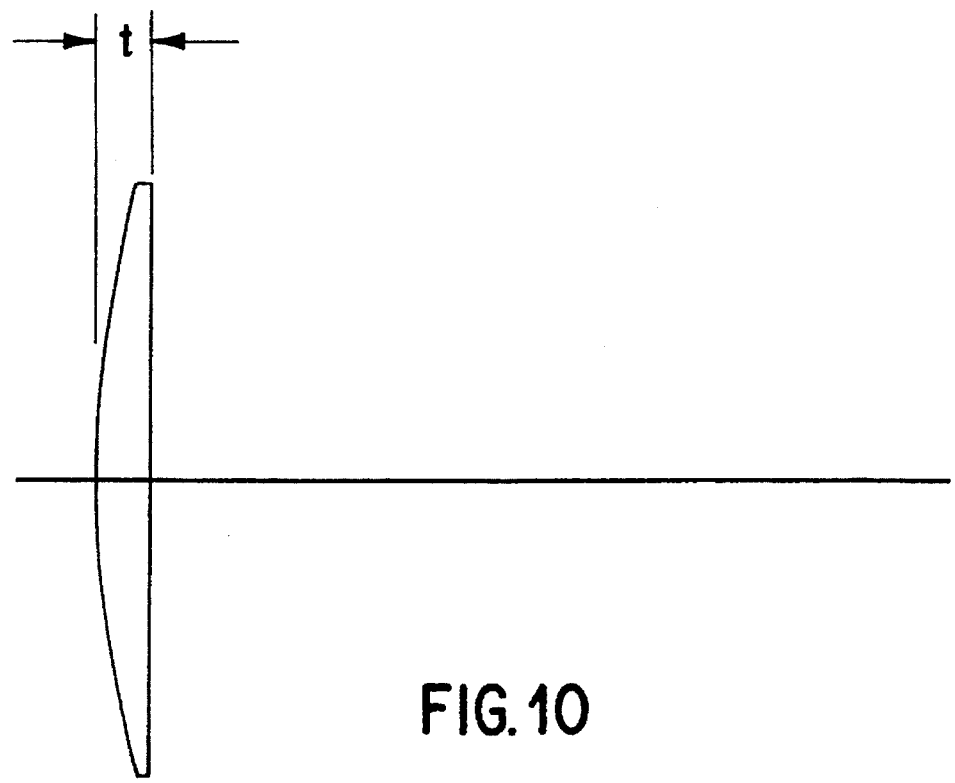
FIG. 10 is a sectional view that shows the lens surface shape of a lens with the same refractive power as the lens of FIG. 9 (4.0 D) and a base curve of 4.25 D.
Figure 11:
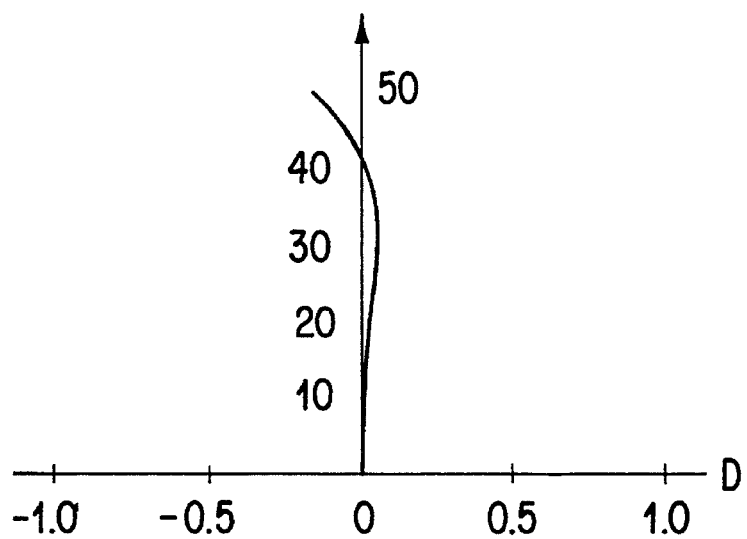
FIG. 11 is an aberration diagram that shows the astigmatism in the field of vision when the lens of FIG. 9 having a base curve of 7.0 D is used.

The lens shown in FIG. 3 is an aspherical lens that corresponds to the spherical lens shown in FIG. 10 as described above, which has a refractive power of 4.0 D and a base curve of 4.25 D. This lens embodies the present invention for close-range (30 cm) viewing.

The lens of FIG. 3 includes a first refractive surface cross section 1a, a second refractive surface cross section 2a, and an axis of symmetry 3a. A dashed line 4a represents an arc with a curvature corresponding to the base curve of a conventional spherical lens. The radius of curvature R1 of the arc 4a is 117.647 mm, and the radius of curvature R2 of the second refractive surface cross section 2a is 1588.341 mm.

The first refractive surface cross section 1a (the meridional line) of the lens of FIG. 3 has the same base curve curvature as the arc 4a in the vicinity of the axis of symmetry 3a, but the curvature becomes smaller than the base curve curvature near the periphery of the lens. As a result, the first refractive surface cross section 1a projects farther forward at the periphery than the arc 4a of the base curve.

FIG. 4(a) shows the difference Z between the curvatures in the meridional and sagittal directions. The horizontal axis shows the distance h from the axis of symmetry 3a, and the vertical axis shows the value Z. The specific values of Z are as shown in the following Table 2.

TABLE 2

| h (mm) | Z (m$^{-1}$) |
| --- | --- |
| 0.0 | 0.000 |
| 5.0 | −0.102 |
| 10.0 | −0.382 |
| 15.0 | −0.772 |
| 20.0 | −1.181 |
| 25.0 | −1.530 |
| 30.0 | −1.771 |
| 35.0 | −1.920 |

As shown in FIG. 4(a), the value of Z slowly decreases as the distance h from the axis of symmetry 3a increases. The rate of decrease in the value of Z begins to slow in the region of 20 to 25 mm from the axis of symmetry 3a.

FIG. 3 shows the shape of the first refractive surface that results from varying the Z value in this manner. In the lens of FIG. 3, the center thickness can be decreased more than in a conventional ophthalmic lens. Moreover, the protrusion of the first refractive surface of the conventional lens can be reduced.

Figure 9:
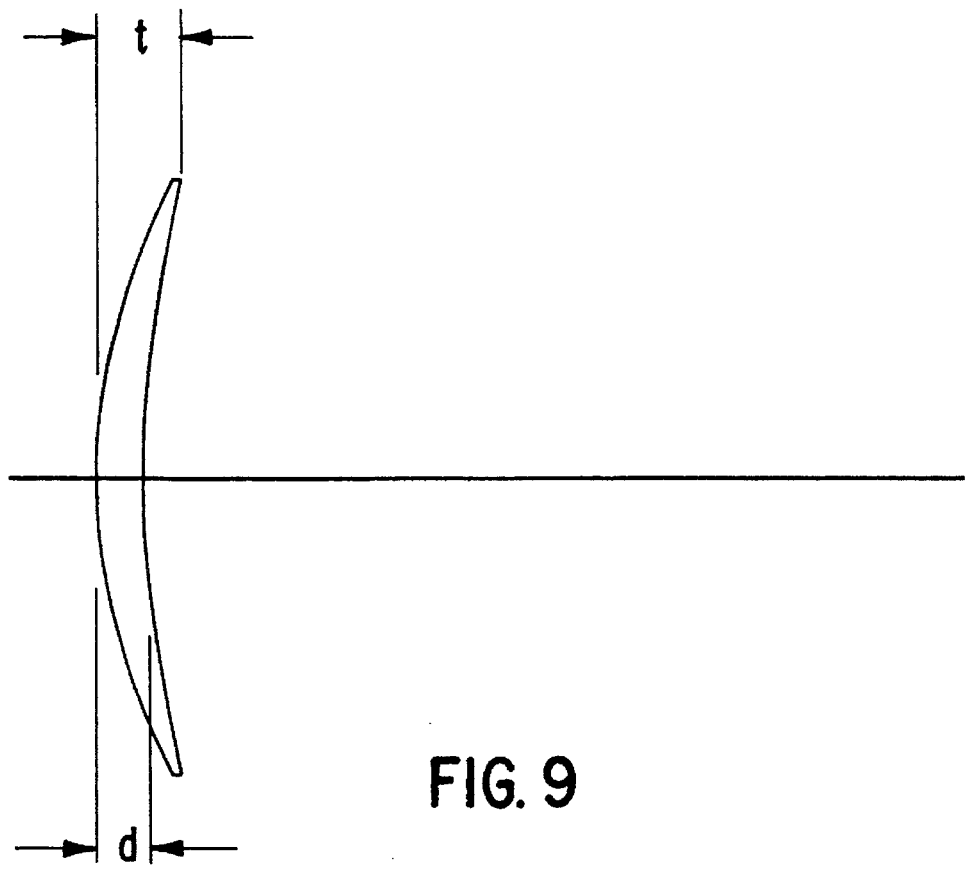
FIG. 9 is a sectional view that shows the lens surface shape of a conventional spherical ophthalmic lens that is designed for close-range viewing.

In the lens of the second embodiment, the center thickness d is 5.3 mm, and the amount by which the lens protrudes is 5.7 mm. Compared with the corresponding conventional spherical lens of FIG. 9, the lens of the second embodiment reflects a decrease in center thickness of 0.9 mm and a 4.5 mm decrease in protrusion amount, resulting in a thinner and flatter lens.

Figure 4B:
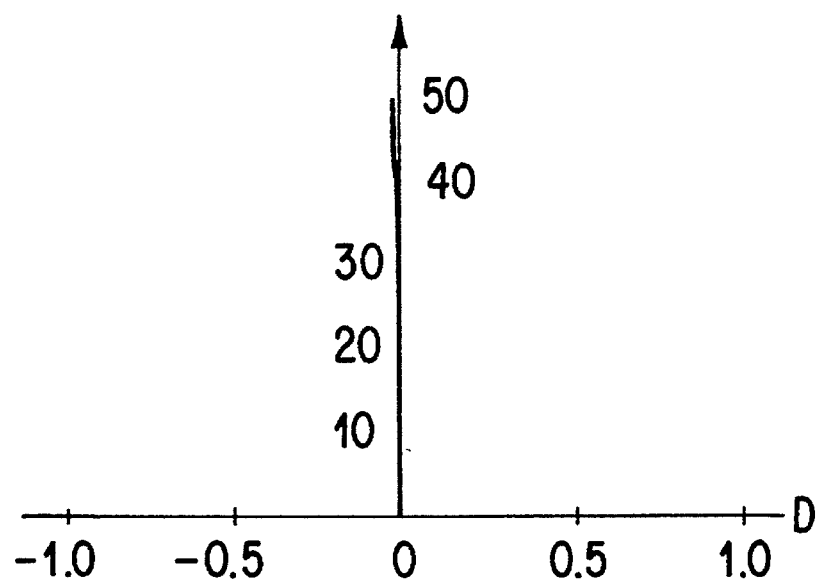
FIG. 4(b) is an aberration diagram showing the variation in astigmatism of the aspherical ophthalmic lens of FIG. 3.
Figure 12:
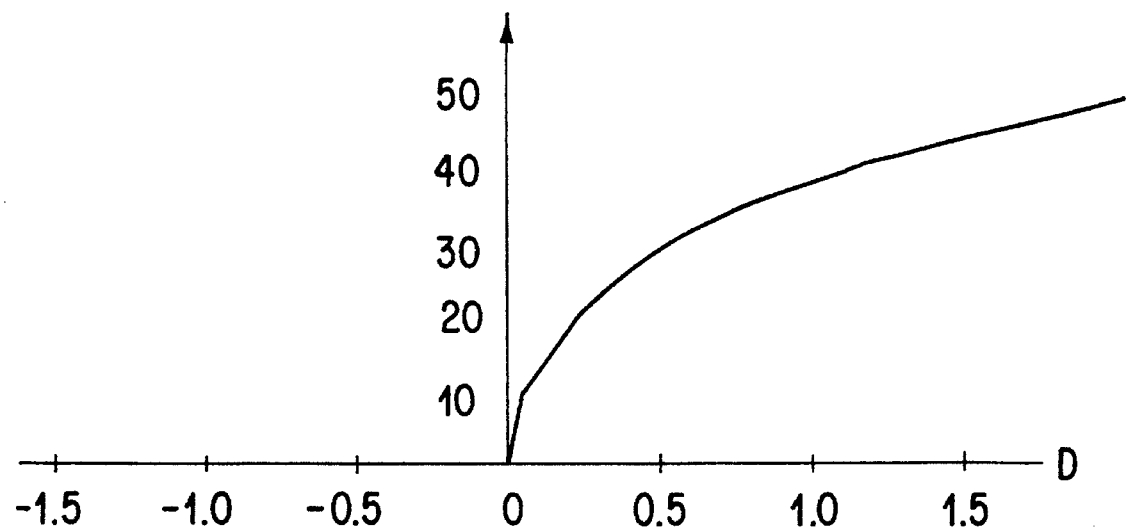
FIG. 12 is an aberration diagram that shows the astigmatism in the field of vision when the lens of FIG. 10 having a base curve of 4.25 D is used.

FIG. 4(b) shows the astigmatism for close-range viewing (30 cm) when the lens of FIG. 3 is used. Even though the base curve has been decreased to 4.25 D, as with the lens shown in FIG. 10, FIG. 4(b) shows that the astigmatism is sufficiently corrected when the lens of FIG. 3 is used. The difference can be clearly seen when compared with FIG. 12, which shows the astigmatism when the lens shown in FIG. 10 is used.

In each of the embodiments described above, the curve of the first refractive surface is made weaker, and a special aspherical surface shape is used for the first surface to correct the astigmatism generated by the use of a weaker curve. As a result, the large center thickness, protrusion amount and image magnification ratio of the prior art lenses are avoided, and an ophthalmic lens having superior optical performance can be achieved. Although the value of Z is changed similarly for both of the embodiments described above, the extent of change is generally greater in the lens designed for far-range viewing than in the lens designed for close-range viewing, as can be seen by comparing FIG. 2(a) and FIG. 4(a).

Therefore, for an aspherical ophthalmic lens having a positive refractive power that is symmetrical about the axis of symmetry and has an aspherical front refractive surface and a rear refractive surface, the value of the curvature difference Z should decrease, preferably monotonically, at a distance of at least 20 mm from the axis of rotation (i.e., the axis of symmetry) in the direction toward the periphery of the lens.

Furthermore, when the curvature of the front refractive surface at the axis of symmetry is taken as $\rho$ (m$^{-1}$), the refractive index of the lens as n, and the distance from the axis of symmetry as h (m), advantageous results occur if the following condition is satisfied over a range from at least 20 mm from the axis of symmetry in the direction of the periphery of the lens:

$$(n-1)*\rho*h<|Z|<1000*(n-1)*\rho*h$$

In the lens described above, the astigmatic aberration, which results from decreasing the base curve of the first refractive surface, is corrected if the first refractive surface is shaped according to the above relationship. Furthermore, although the lens refractive power increases, the lens center thickness and the protrusion amount decrease.

As described above, the first embodiment is based on a far-range viewing design, and the second embodiment is based on a close-range viewing design. Accordingly, the astigmatism for viewing at an arbitrary distance between the distances for far-range and close-range viewing can be controlled, based on the range of variation of the Z value so that superior optical performance can be obtained over the entire lens range, according to the respective purposes of the different lenses.

In addition, by combining the Z value variations discussed above with low base curves, lenses can be obtained that have superior optical performances, a relatively thin center thickness and a flat profile, which results in a desirable external appearance. Furthermore, if the lens is fabricated from a material with a higher refractive index, the advantages of the present invention are accentuated.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An aspherical ophthalmic lens having a positive refractive power, an axis of symmetry and a periphery, comprising:

an aspherical front refractive surface having a meridional plane and a sagittal plane that intersects said meridional plane, said sagittal plane having a sagittal plane curvature of $\rho_s$ and said meridional plane having a meridional plane curvature of $\rho_m$, wherein a curvature difference Z defined as $Z=\rho_m-\rho_s$ decreases over a range from said axis of symmetry to at least approximately 20 mm in a direction from said axis of symmetry toward said periphery; and a rear refractive surface.

2. The aspherical ophthalmic lens of claim 1, wherein a value of Z in said direction from said axis of symmetry toward said periphery decreases monotonically.

3. The aspherical ophthalmic lens of claim 2, wherein a refractive index of said lens is n and a distance from said axis of symmetry in said direction is h, and wherein |Z| is greater than $(n-1)*\rho*h$.

4. The aspherical ophthalmic lens of claim 2, wherein a refractive index of said lens is n and a distance from said axis of symmetry in said direction is h, and wherein |Z| is less than $1000*(n-1)*\rho*h$.

5. The aspherical ophthalmic lens of claim 1, wherein a refractive index of said lens is n and a distance from said axis of symmetry in said direction is h, and wherein |Z| is greater than $(n-1)*\rho*h$.

6. The aspherical ophthalmic lens of claim 1, wherein a refractive index of said lens is n and a distance from said axis of symmetry in said direction is h, and wherein |Z| is less than $1000*(n-1)*\rho*h$.

7. The aspherical ophthalmic lens of claim 1, wherein said sagittal plane curvature $\rho_s$ and said meridional plane curvature $\rho_m$ are selected such that said lens provides correction for far-range viewing.

8. The aspherical ophthalmic lens of claim 1, wherein said sagittal plane curvature $\rho_s$ and said meridional plane curvature $\rho_m$ are selected such that said lens provides correction for close-range viewing.

9. An aspherical ophthalmic lens having a positive refractive power, an axis of symmetry and a periphery, comprising:

an aspherical front refractive surface having a meridional plane and a sagittal plane that intersects said meridional plane, said sagittal plane having a sagittal plane curvature of $\rho_s$ and said meridional plane having a meridional plane curvature of $\rho_m$;

a rear refractive surface; and reducing means for reducing a thickness of said lens while maintaining optical performance, wherein said reducing means includes a front refractive surface curvature difference Z defined as $Z=\rho_m-\rho_s$ that decreases over a range from said axis of symmetry to at least approximately 20 mm in a direction of said axis of symmetry toward said periphery.

* * * * *

UNITED STATES PATENT AND TRADEMARK OFFICE
CERTIFICATE OF CORRECTION

PATENT NO. : 5,610,670
DATED : March 11, 1997
INVENTOR(S) : Yasunori UENO

It is certified that error appears in the above-indentified patent and that said Letters Patent is hereby corrected as shown below:

On title page, in the title, item [54] and col. 1, line 1,
"OPTHALMIC" should read --OPHTHALMIC--

Signed and Sealed this

Twentieth Day of May, 1997

Attest:

BRUCE LEHMAN

*Attesting Officer*   *Commissioner of Patents and Trademarks*